United States Patent [19]

Sartor et al.

[11] Patent Number: 4,586,224
[45] Date of Patent: May 6, 1986

[54] GUIDE ROLLER FOR PAPER AND FOIL HANDLING APPARATUS SUCH AS PRINTING PRESSES

[75] Inventors: Bruno Sartor, Niederzier; Jürgen Hüftle, Langerwehe; Burkhart Strasmann, Aachen; Franz-Josef Fischer, Juelich, all of Fed. Rep. of Germany

[73] Assignee: Uranit GmbH, Juelich, Fed. Rep. of Germany

[21] Appl. No.: 639,027

[22] Filed: Aug. 9, 1984

[30] Foreign Application Priority Data

Aug. 5, 1983 [DE] Fed. Rep. of Germany ... 8322639[U]
Sep. 1, 1983 [DE] Fed. Rep. of Germany ....... 3331566

[51] Int. Cl.⁴ .............................................. A01B 29/00
[52] U.S. Cl. .................................. 29/121.2; 29/121.6; 29/131; 29/132
[58] Field of Search ................. 29/121.2, 121.4, 121.6, 29/125, 130, 131, 132; 156/175, 173

[56] References Cited

U.S. PATENT DOCUMENTS

| | | | |
|---|---|---|---|
| 3,966,864 | 6/1976 | Stenzenberger | 156/175 X |
| 4,029,249 | 6/1977 | Nagel et al. | 29/121.2 X |
| 4,470,860 | 9/1984 | Gill et al. | 156/175 |
| 4,473,420 | 9/1984 | Medney | 156/175 X |

FOREIGN PATENT DOCUMENTS

| | | | |
|---|---|---|---|
| 746226 | 8/1970 | France | 29/132 |
| 50-707 | 1/1975 | Japan | 29/132 |
| 24293 | 2/1982 | Japan | 29/121.4 |
| 2073850 | 10/1981 | United Kingdom | 29/110 |

*Primary Examiner*—Howard N. Goldberg
*Assistant Examiner*—Timothy V. Eley

[57] ABSTRACT

A roller for paper or foil sheet handling machines such as printing presses comprises a cylinder consisting of fiber reinforced plastic material including alternate layers of circumferentially wound fibers and helically wound fibers. The helically wound fibers are arranged in groups of strings which are spaced from one another so as to form rhombus-shaped depressions in the surface of the cylinder, thereby providing rollers of relatively low masses but high strengths which have surfaces capable of firmly engaging the paper or foil sheets.

6 Claims, 3 Drawing Figures

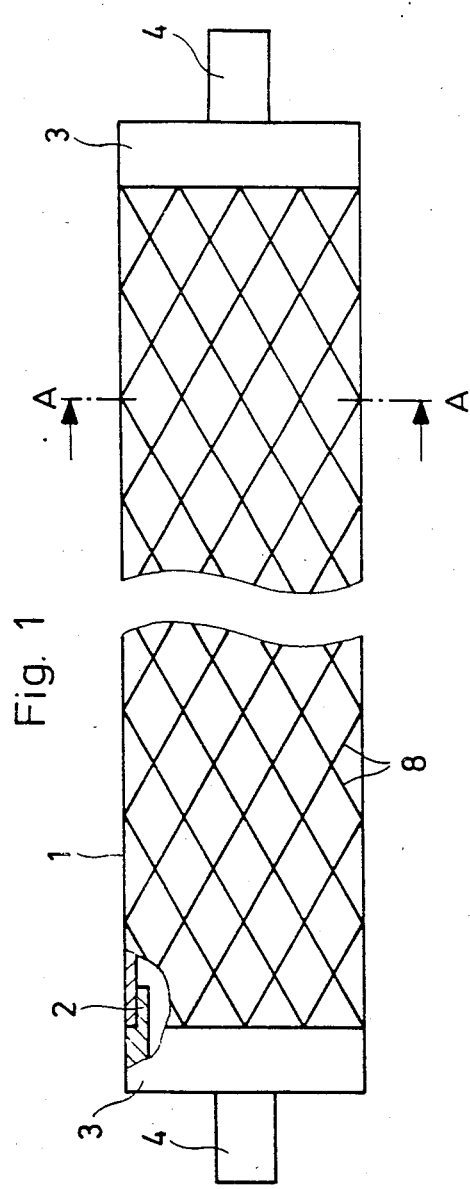
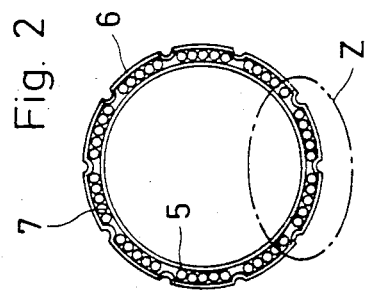
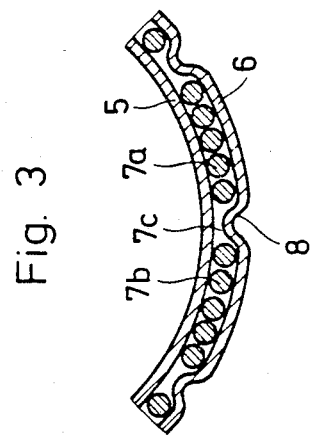

GUIDE ROLLER FOR PAPER AND FOIL HANDLING APPARATUS SUCH AS PRINTING PRESSES

BACKGROUND OF THE INVENTION

The invention relates to guide or feed rollers for paper and foil handling apparatus, for example, for printing presses.

In machines of the above type, guide and feed rollers are utilized to align sheets of paper or plastic foil so as to direct them and to feed them evenly through the machines. The rollers have to be well balanced, they must be resistant to bending and also resistant to corrosion and should have a low mass. Their surface should further provide traction so as minimize slipping between the rollers and the sheets.

Metallic rollers as presently in use are not capable of fulfilling all these requirements. Metal rollers with high bending resistance and good balance, for example, usually have large masses and they also have a smooth non-gripping surface. In many cases the minimum wall thickness required for the necessary bending resistance cannot be obtained in an economical manner because of manufacturing problems so that the weight of the rollers is larger than necessary.

It is the principal object of the present invention to provide guide or feed rollers with a surface adapted to engage the surfaces of the paper or foil sheets so that they require only a small looping angle for sufficient traction as feed rollers and which are not susceptible to imbalance and furthermore, have a high bending resistance, small mass and permit high feed speeds.

SUMMARY OF THE INVENTION

In rollers for paper or foil sheet handling machines such as printing presses or paper processing apparatus, the roller cylinder consists of fiber reinforced plastic materials including alternate layers of circumferentially wound fibers and helically wound fibers. In at least one layer of helically wound fibers the fibers are arranged in groups of strings which are spaced from one another so as to form rhombus-shaped depressions in the surface of the cylinder.

Preferably, the top layer includes circumferentially wound fibers and the layer underneath includes the helically wound fibers which are arranged in spaced groups.

Rollers of carbon fiber reinforced plastic wherein the fibers are disposed in helical and circumferential layers so as to provide a suitable matrix, have been found to be especially advantageous.

Preferably, the helical windings are disposed at a relatively steep angle. The roller bearings are cemented either directly into the roller cylinder or into end walls fitted into the roller cylinder at its axial ends. There may be, for example, end walls cemented into the roller cylinder, which end walls have central bearing journals.

Compared to metallic guide or feed rollers, rollers of fiber reinforced plastic have the following important advantages;

The roller surface is somewhat rough and engages the sheets so that the required sheet looping angle needs to be only relatively small. This permits a more compact, space saving apparatus design. In some cases the one or the other feed roller may even be eliminated.

Balancing is usually not necessary since the rollers can be manufactured with the required accuracy and, furthermore, are relatively light.

The small masses of the rollers permit rapid speed changes, that is, fast slow down and speed up of the sheet movements without the danger of roller slippage or ripping of the sheets. As a result, special drive and brake apparatus for the various rollers are not necessary.

The small roller masses further permit the use of increased paper and foil sheet speeds without requiring additional drive, control or brake apparatus. Further, because of the rhombus-shaped depressions in the roller surface, any air is permitted to escape, thereby preventing the formation of air cushions between the rollers and the foil at high feed speeds. As a result, the foil remains in engagement with the roller surface even at high feed speeds.

The tension applied to the paper sheets for engagement with the rollers may be reduced so that lower quality papers with smaller tear resistance may be utilized.

Fiber reinforced plastic materials are, by nature, very resistant to corrosion so that, generally, no special corrosion preventive measures are required.

The small masses of the many feed rollers used in a machine also reduce the structural frame strength and the foundation load requirements.

SHORT DESCRITION OF THE DRAWINGS

FIG. 1 is a side view of the feed roller according to the invention;

FIG. 2 is a cross-sectional view along line A—A of FIG. 1; and

FIG. 3 is an enlarged view of the section Z of FIG. 2.

DESCRIPTION OF A PREFERRED EMBODIMENT

As shown in FIG. 1, a feed roller includes a cylinder 1 consisting of carbon fiber reinforced plastic material wherein the plastic matrix, normally a resin with which the fibers are soaked, is hardened after the cylinder is wound. At its opposite axial ends the cylinder 1 is provided with end walls 3 having circular axial projections 3 fitted and cemented into the cylinder 1 and provided with bearing journals 4.

As shown in FIG. 2, the cylinder 1 consists of alternate layers of circumferential windings 5, 6 and helical windings 7. Between groups (7a, 7b) of helically wound strings, there are provided gaps 7c (FIG. 3) so that rhombus-shaped depressions 8 are formed on the surface of the roller even when the outermost layer has circumferential windings, since the outermost layer is pressed into the gaps 7c during hardening of the plastic matrix. This provides a grid structure which insures firm and even engagement of the sheets with the roller surface since air can escape into the depressions 8 so that no air cushions are formed between the roller surface and the sheet even at high feed speeds. Lifting of the roller from the sheet and disengagement of roller and sheet is therefore prevented.

If it is desired to apply to the cylinder surface a particular texture, a sheet of woven material may be applied to the cylinder surface during hardening, which sheet is removed thereafter but its imprints remain on the cylinder surface.

The cylinder may also be composed of layers of different fiber materials. It is, for example, advantageous if the outermost layer consists of glass fiber reinforced plastic whereas the inner layers consist of carbon fiber reinforced plastic.

We claim:

1. A roller for paper or foil handling machines such as printing presses, said roller comprising a cylinder consisting of fiber reinforced plastic material having alternate layers of circumferentially wound fibers and helically wound fibers, some of said helically wound fiber layers including groups of strings which are spaced from one another with the groups of adjacent layers being wound in the opposite sense so as to form rhombus-shaped gaps therebetween and the outermost layer having circumferentially wound fibers which, during hardening of the plastic material, are pressed onto said helically wound fiber layers and into said gaps so as to provide for a roller surface with rhombus-shaped texture and high wear resistance.

2. A roller according to claim 1, wherein said cylinder consists at least partially of carbon fiber reinforced plastic material.

3. A roller according to claim 1, wherein axially projecting journals are cemented into the ends of said cylinder.

4. A roller according to claim 1, wherein end walls are cemented into the opposite ends of said cylinder and axially projecting journals are mounted on said end walls.

5. A roller according to claim 1, wherein said cylinder is composed of different types of fiber reinforced plastic materials.

6. A roller according to claim 5, wherein the outermost layer of said cylinder is glass fiber reinforced and the inner layers are carbon fiber reinforced.

* * * * *